United States Patent [19]

Basil et al.

[11] Patent Number: 6,042,737
[45] Date of Patent: Mar. 28, 2000

[54] PROCESS FOR IMPROVING ADHESION OF COATINGS TO POLYMERIC SUBSTRATES AND ARTICLES PRODUCED THEREBY

[75] Inventors: John D. Basil, Pittsburgh; Robert M. Hunia, Kittanning; Robin Hunt, Pittsburgh, all of Pa.

[73] Assignee: PPG Industries Ohio, Inc., Cleveland, Ohio

[21] Appl. No.: 09/066,166

[22] Filed: Apr. 24, 1998

Related U.S. Application Data

[60] Provisional application No. 60/048,676, Jun. 5, 1997.

[51] Int. Cl.[7] .................................................. B44C 1/22
[52] U.S. Cl. .......................... 216/37; 216/37; 216/83; 216/26
[58] Field of Search .................. 216/37, 83, 26

[56] References Cited

U.S. PATENT DOCUMENTS

| | | | |
|---|---|---|---|
| 3,971,872 | 7/1976 | LeBouef | 428/412 |
| 4,307,045 | 12/1981 | Imada et al. | 264/22 |
| 4,425,403 | 1/1984 | Taniguchi et al. | 428/331 |
| 4,904,525 | 2/1990 | Taniguchi et al. | 428/328 |
| 5,098,618 | 3/1992 | Zelez | 264/22 |
| 5,104,692 | 4/1992 | Belmares | 427/164 |
| 5,391,327 | 2/1995 | Ligas et al. | 252/586 |
| 5,665,436 | 9/1997 | Chitarra et al. | 427/558 |

OTHER PUBLICATIONS

Abstract JP5117429 A 930514, Manufacture of plastic moldings with hard surface layers.

Abstract JP Pub. No. 62050336, date May 3, 1987, Surface Treatment of Plastic Lens.

"New UV/ozone treatment improves adhesiveness of polymer surfaces", Dr. N. S. McIntyre and M. J. Walzak, Modern Plastics, Mar. 1995, pp. 79, 80 and 83.

"Surface cleaning by ultraviolet radiation". R. R. Sowell, et al., J. Vac. Sci. Technol., vol. 11, No. 1, Jan./Feb. 1974, pp. 474–475.

"The Effect of Ultraviolet Radiation on Wettability of Polymer Surfaces", K. Esumi, et al., Bull. Chem. Soc. Jpn., 55, pp. 1649–50, May 1982.

*Primary Examiner*—William Krynski
*Assistant Examiner*—B. Shewareged
*Attorney, Agent, or Firm*—Frank P. Mallak; Irwin M. Stein

[57] ABSTRACT

Describes a process for improving the adhesion of polymeric coatings to organic polymeric substrates and photochromic polymeric substrates. The process comprises irradiating the surface of a polymeric substrate prepared from or coated with a monomer composition having acrylic functionality in an oxygen containing environment with ultraviolet light; etching the treated surface; and applying to the etched surface a polymer-forming coating composition. Further described are articles and photochromic articles comprising in combination a polymeric substrate having on at least one surface thereof an adherent coating or photochromic coating prepared by the aforedescribed process.

15 Claims, No Drawings

PROCESS FOR IMPROVING ADHESION OF COATINGS TO POLYMERIC SUBSTRATES AND ARTICLES PRODUCED THEREBY

CROSS REFERENCE TO RELATED APPLICATIONS

This application claims priority to provisional application Ser. No. 60/048,676 filed Jun. 5, 1997.

DESCRIPTION OF THE INVENTION

This invention relates generally to the art of applying coatings to polymeric substrates. More particularly, the present invention relates to the process of adhering polymeric coatings to substrates prepared from or coated with monomer formulations having acrylic functionality, to the resultant coated substrates, and to optical articles having such coated substrates.

It is reported that the outermost surface of most organic polymers is hydrophobic due to a preponderance of nonpolar groups and is therefore difficult to wet. Some polymers have such a low surface tension that it is difficult to formulate coatings that will wet the polymer surface. Many of the conventional coatings, e.g., protective hardcoats, paints, inks and adhesives, applied to polymers are hydrophilic. Consequently, they do not form strong chemical interactions with the hydrophobic surface of the polymer, and therefore do not adhere well to the polymer.

Recently, photochromic plastic articles, particularly photochromic ophthalmic photochromics, e.g., lenses, have been the subject of particular attention. Coatings, e.g., protective abrasion resistant coatings are often applied to the surface of such ophthalmic articles. It is typically more difficult to obtain adhesion of a coating to a photochromic polymeric substrate, as compared to non-photochromic polymeric substrates, due to the presence of organic photochromic compounds, stabilizers, etc. at or near the surface of the polymeric substrate.

Pretreatment processes are frequently used on polymeric substrates to increase the surface tension of the substrate and provide functional groups to interact with polar groups present in coatings applied to such substrates. It is disclosed in U.S. Pat. No. 4,425,403, column 1, line 57–65, that the adhesion between a substrate and coating materials applied to the substrate is improved by various kinds of surface treatments. Such treatments are, for example, a chemical treatment with a strong alkali or oxidizing material, hot air treatment, flame cleaning, irradiation with electromagnetic (including ultraviolet) radiation, corona discharge, activation by cold plasma, and the like.

The combination of ultraviolet light and ozone (UVO) to treat polymeric substrates has been reported to increase the surface energy and wettability of polymer surfaces. See N. S. McIntyre et al., "New UV/Ozone Treatment Improves Adhesiveness of Polymer Surfaces", Modern Plastics, March 1995, pp. 79, 80 and 83. However, because of certain disadvantages of the aforementioned techniques, for example environmental considerations, instability of the treated surface and poor controllability of the process, alternative methods are sought for pretreatment of polymers. Thus, there is a real commercial incentive to develop methods capable of modifying the surface of a polymer to improve adhesion of coatings applied to the polymer surface.

Although the use of ultraviolet radiation as a pretreatment for plastic substrates has been described generally in the literature, it has now been discovered that irradiating a polymeric substrate prepared from monomer formulations having acrylic functionality, particularly a photochromic polymeric substrate, with a specific dosage of ultraviolet light in an oxygen-containing environment produces a long lasting effect on the substrate's surface. When the ultraviolet light treatment of the polymer substrate is followed by chemically etching prior to the application of a coating, the adhesion of a polymeric coating to such a treated polymer substrate is significantly improved. The aforementioned long lasting effect of the aforedescribed ultraviolet treatment enables storage of such treated substrates for a week before etching and coating without a loss of the improvement in coating adhesion.

DETAILED DESCRIPTION OF THE INVENTION

A contemplated embodiment of the process of the present invention comprises the following steps:

(a) irradiating the surface of a polymeric substrate prepared from a monomer composition having acrylic functionality in an oxygen containing environment with ultraviolet light;

(b) etching the treated surface of step (a); and (c) applying to the etched surface of step (b) a polymer-forming coating composition.

A further contemplated embodiment of the process of the present invention includes step (d) curing the applied polymeric coating of step (c). In a preferred embodiment of the process, the temperature of the substrate is maintained in the range of 25–185° C. during the ultraviolet irradiation step.

The term "polymeric substrate" is defined herein as polymeric material prepared from or coated with a monomer formulation having acrylic functionality. As defined, polymeric substrate includes polymeric material prepared from monomers substantially free of acrylic functionality, e.g., bis "allyl carbonate" monomer, that are coated with a monomer formulation having acrylic functionality.

Other than in the operating examples, or where otherwise indicated, all numbers expressing quantities, ratios, ranges, etc. used herein are to be understood as modified in all instances by the term "about".

The level of ultraviolet radiation received by a substrate exposed to such radiation, i.e., the dosage is measured as milliJoule per centimeter$^2$ (mJ/cm$^2$) using an appropriate instrument, e.g., an IL 390 Light Bug from International Light. The dosage required to modify the surface of a polymer substrate and thereby enhance the adhesion of a polymer coating to the substrate is that dosage which when followed by an etching step results in a better adhesion rating as measured by the ASTM D-3359-93 Standard Test Method for Measuring Adhesion by Tape Test-Method B, i.e., an adhesion improving amount. The adhesion improving amount may range from 500 to 10,000 mJ/cm$^2$, preferably, from 600 to 6000 mJ/cm$^2$, more preferably, from 700 to 4,000 mJ/cm$^2$, most preferably from 1000 to 2,500 mJ/cm$^2$, and still more preferably, at least 500 and not greater than 2,000 mJ/cm$^2$.

In one embodiment, the substrate to be irradiated is positioned in front of a source of ultraviolet radiation at a distance and for a time interval that will enable the substrate to receive an adhesion improving amount of ultraviolet dosage. For example, a dosage of 2,300 mJ/cm$^2$ was measured for a substrate positioned on a conveyor 4 inches (10.2 cm) in front of a 200 watts/inch (79 watts/cm) lamp for 10 seconds. During the UV irradiation step, the substrate may be maintained at room temperature, e.g., 22° C., or in a preferred embodiment, it may be heated to an elevated temperature which is below the temperature at which damage to the substrate occurs. For example, the substrate may be maintained at temperatures from 25 to 185° C., preferably from 50 to 150° C., and more preferably from 90 to 135° C. during the irradiation step.

The atmosphere in which irradiation occurs may be one in which the partial pressure of oxygen is at least 15 Torr, preferably, at least 50 Torr, more preferably, at least 150 Torr and most preferably is at least 160 Torr, which is the partial pressure of oxygen in a standard atmosphere. Ultraviolet (UV) light is defined herein as radiation in the electromagnetic spectrum from 400 nanometers, just beyond the violet in the visible spectrum, to 4 nanometers, on the border of the x-ray region. Preferably, the ultraviolet light has a substantial energy distribution in the electromagnetic spectrum of greater than 200 nanometers (nm), preferably greater than 250 nm and more preferably greater than 300 nm. By substantial energy distribution, is meant that the highest percentage of ultraviolet source output, i.e., energy, occurs at a particular wavelength or within a range of wavelengths. Any ultraviolet light source may be used in the invention, such as, low pressure mercury lamps, high pressure mercury lamps, halide doped mercury lamps, ultrahigh pressure mercury lamps, fusion electrodeless lamps, xenon lamps and/or arc lamps. The specific ultraviolet light source used is selected to impart an adhesion improving amount of ultraviolet radiation given the conditions of irradiation (distance, time interval, oxygen partial pressure, and substrate temperature). Further information about UV sources may be found in S. P. Pappas, *UV Curing: Science and Technology*, published by Technology Marketing Corporation, 1978, pages 96–132, which is incorporated herein by reference.

The amount and type of ultraviolet radiation produced by different sources of ultraviolet radiation will vary, i.e., the amount of, for example, ultraviolet, visible, infrared and convected radiation will vary. The output or energy from a source is measured in watts per inch for each type of radiation. For example, a UV medium pressure mercury arc lamp having a total lamp output of 200 watts per inch delivers 34 watts/inch as UV radiation, 56 watts/inch as visible radiation and 110 watts/inch as infrared radiation; while a fusion electrodeless lamp having a total lamp output of 300 watts/inch delivers 109 watts/inch as UV radiation, 84 watts/inch as visible radiation 50 watts/inch as infrared radiation and 57 watts/inch as convected radiation. The energy distribution of the output for specific wavelength ranges also varies for different UV sources. For example, a mercury "H" bulb has a substantial energy distribution in the 200 to 300 nm range and delivers 45.1 watts/inch in the 200 to 300 nanometer (nm) range, 31 watts/inch in the 300 to 400 nm range and 17.7 watts/inch in the 400 to 470 nm range; while a mercury "D" bulb has a substantial energy distribution in the 300 to 400 nm range and delivers 24.6 watts/inch in the 200 to 300 nm range, 63.8 watts/inch in the 300 to 400 nm range and 26.9 watts/inch in the 400 to 470 nm range. Depending on the UV source chosen, an additional source of heat may not be necessary to maintain the substrate at a desired temperature due to the heat generated by the UV source.

After the polymeric substrate has been treated with an adhesion improving amount of ultraviolet radiation, the substrate is subjected to etching of the surface. The amount of etching necessary after the ultraviolet treatment is an amount that results in a better adhesion rating of the coating as compared to a substrate that was etched and coated as measured by ASTM D 3359-93 Standard Test Method. An etched surface may be obtained by employing a variety of methods known in the art. Such methods include hydroxylation with an aqueous solution of strong alkali, e.g., sodium hydroxide or potassium hydroxide, which solution may also contain a fluorosurfactant. See U.S. Pat. No. 3,971,872, column 3, lines 13 to 25; and U.S. Pat. No. 5,104,692, column 13, lines 10 to 59, which disclosures are incorporated herein by reference. In one embodiment, an etched surface may be obtained by immersing the substrate for 5 minutes in a 12 weight percent aqueous sodium hydroxide solution maintained at 50° C.

Etching methods other than chemical etching methods include treatment with activated gas, i.e., treatment with ions, electrons or excited gas which are generated under normal or reduced pressure. Examples of ways to generate activated gas include corona discharge, high voltage discharge by using direct electric current, low frequency wave, high frequency wave or microwave under reduced pressure. See U.S. Pat. No. 4,904,525, column 6, lines 10 to 40, which is incorporated herein by reference. Another etching method is treatment with ionized radiation, as described in U.S. Pat. No. 4,425,403, column 4, lines 9 to 19, which is incorporated herein by reference.

The polymer-forming coating composition of the present invention includes compositions resulting in thermoplastic or thermosetting coatings, which are described in the *Kirk-Othmer Encyclopedia of Chemical Technology*, Fourth Edition, Volume 6, pages 669 to 760, which description is incorporated herein by reference. The coating applied to the treated substrate may be a coating comprising at least one polymer obtained from a member selected from the group consisting of polyurethanes, melamine resins, organosilanes, polyvinyl alcohol, polyacrylates, polyamide resins and epoxy resins. Such polymer-forming coating compositions are described in U.S. Pat. No. 4,425,403, which is incorporated herein by reference. Preferably, the polymer-forming coating composition is a polymer-forming organosilane. Various additives such as dyes, leveling agents, flow control agents and other specific materials, which serve a given purpose, may be added to the coating composition.

The polymer-forming organosilanes that can be used in the process of the present invention include organosilane monomer(s), e.g., alkoxysilane monomers, hydrolysates thereof and mixtures of such silane monomers and hydrolysates, that produce tintable or non-tintable cured coatings, and more preferably non-tintable cured coatings which are preferably transparent. The term "transparent" is intended to mean that the cured coating does not substantially change the percentage of visible light transmitted through a transparent polymeric substrate to which it is applied. The tintability of a coating is a function of the amount of dye that the coating acquires under certain defined conditions which is expressed quantitatively by the percentage of light transmitted through the dyed coating.

Conventionally, tintability of a coating is measured by applying the coating to a transparent substrate, e.g., a transparent lens, and determining the percent transmission of the substrate after it has been immersed for selected intervals in a standard dye, e.g., BPI Molecular Catalytic Dye available from Brain Power Incorporated, diluted per instructions in deionized water. Testing of a coated substrate having one surface coated is accomplished by masking the other uncoated surface and performing the tintability test. An indication of the tintability of a coated substrate is determined from the percent transmission results of such a test. For example, a coated substrate having a percent transmission of 90 is less tintable than a coated substrate having a percent transmission of 40, as measured by the tintability test. It is contemplated herein that a non-tintable coating is one having a percent transmission of at least 89, preferably, at least 90, and more preferably, at least 93, as measured by a tintability test. Non-tintable coatings having a percent transmission of less than 89 are also contemplated Suitable organosilane monomers that may be used in the process of the present invention include methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, gamma-methacryloxypropyltrimethoxysilane, gamma-aminopropyltrimethoxysilane, gamma-aminopropyltriethoxysilane, gamma-mercaptopropyltrimethoxysilane, chloromethyltrimethoxysilane, chloromethytriethoxysilane, dimethyldiethoxysilane, gamma-chloropropylmethyldimethoxysilane, gamma-chloropropylmethyldiethoxysilane, tetramethoxysilane, tetraethoxysilane, tetra-n-propoxysilane, tetra-n-butoxysilane, glycidoxymethyltriethoxysilane, alpha-glycidoxyethyltrimethoxysilane, alpha-glycidoxyethyltriethoxysilane, beta-glycidoxyethyltrimethoxysilane, beta-glycidoxyethyltriethoxysilane, alpha-glycidoxypropyltrimethoxysilane, alpha-glycidoxypropyltriethoxysilane, beta-glycidoxypropyltrimethoxysilane, beta-glycidoxypropyltriethoxysilane, gamma-glycidoxypropyltrimethoxysilane, gamma-glycidoxypropylmethyldimethoxysilane, gamma-glycidoxy-propyldimethylethoxysilane, hydrolysates thereof, and mixtures of such silane monomers and their hydrolysates.

Other potential organosilane monomers, include the organosilanes disclosed in U.S. Pat. No. 5,514,466, column 5, line 56 to column 7, line 12, which disclosure is incorporated herein by reference. U.S. Pat. No. 5,514,466, column 7, lines 8–12, discloses the use of organosilicon compounds containing the epoxy group and the glycidoxy group in a coating composition to impart dyeability.

Preferably, the organosilanes used in the process of the present invention are selected from the group consisting of methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, gamma-methacryloxypropyltrimethoxysilane, gamma-aminopropyltrimethoxysilane, gamma-aminopropyltriethoxysilane, gamma-mercaptopropyltrimethoxysilane, chloromethyltrimethoxysilane, chloromethytriethoxysilane, dimethyldiethoxysilane, gamma-chloropropylmethyldimethoxysilane, gamma-chloropropylmethyldiethoxysilane, tetramethoxysilane, tetraethoxysilane, tetra-n-propoxysilane, tetra-n-butoxysilane, glycidoxymethyltriethoxysilane, gamma-glycidoxypropyltrimethoxysilane hydrolysates thereof, and mixtures of such silane monomers and their hydrolysates.

The coating composition of the present invention may be applied by any of the methods used in coating technology such as, for example, spray coating, spin coating, spread coating, dip coating, casting or roll-coating. Preferably, the coating composition is applied by spin coating or spray coating methods, and most preferably, by spin coating methods.

The organosilane polymer-forming coating composition is preferably applied to the polymeric substrate surface as a solution of organosilane monomers in an appropriate solvent, e.g., water or an aqueous solution of an organic solvent, e.g., alkanols, such as methanol and ethanol, by dip, flow or other conventional application techniques. The solvent is then evaporated and the polymeric organosilane coating is cured by heating to elevated temperatures, typically 104° to 248° F. (40° to 120° C.) for 2 to 16 hours, or by exposing it to UV radiation (when the coating composition is curable by exposure to UV radiation).

The organosilane coating composition will generally include a leveling amount of a surfactant, i.e., an amount sufficient to allow the coating to spread evenly on the surface of the substrate, a solvating amount of a low molecular weight organic solvent, i.e., an amount sufficient to solubilize the organosilane monomers in the coating solution, a catalytic amount of a water-soluble acid, i.e., an amount sufficient to result in the polycondensation of the silane monomers, and water in an amount sufficient to form hydrolysates of the silane monomers and dissolve the catalytic amount of water-soluble acid.

In the context of the present invention, the exact nature of the coating (or coating composition) is not critical. Any coating, whether it be a protective coating, abrasion resistant coating, anti-reflective coating, photochromic coating, etc., can be used since the essence of the present invention relates to improving the adhesion of such coating to the substrate.

Following application of the coating composition to the treated surface of the polymeric substrate, the coating is cured. Depending on the polymer-forming component selected, the coating may be cured at temperatures ranging from 22° C. to 200° C. If heating is required to obtain a cured coating, temperatures of between 80° C. and a temperature above which the substrate is damaged due to heating, e.g., 80° C. to 150° C., are typically used. For example, certain organic polymeric materials may be heated up to 130° C. for a period of 1 to 16 hours in order to cure the coating without causing damage to the substrate. While a range of temperatures has been described for curing the coated substrate, it will be recognized by persons skilled in the art that temperatures other than those disclosed herein may be used. Additional methods for curing the coating composition include irradiating the coating with infrared, ultraviolet, gamma or electron radiation so as to initiate the polymerization reaction of the polymerizable components in the coating.

The polymer substrate, treated in accordance with the present invention is prepared from or coated with monomers having acrylic functionality, which may be represented by the following graphic formula I:

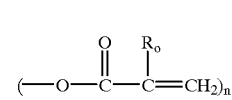

I wherein $R_0$ is hydrogen or methyl, and n is selected from the integers 1–4, preferably, $R_0$ is methyl and n is 1 or 2. The polymer may be a homopolymer or copolymer comprising at least 5 weight percent, based on the total weight of the monomers, of acrylic functional monomers. Preferably, the acrylic functional monomer represents at least 30 weight percent, more preferably, at least 50 weight percent, and most preferably at least 80 weight percent of the monomers used to prepare the substrate.

Preferably, the polymer substrate is a solid transparent or optically clear solid material. Examples of suitable substrates are those prepared from monomers or mixtures of monomers selected from the following groups:

(a) diacrylate or dimethacrylate compounds represented by graphic formula II:

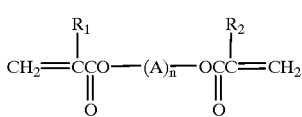

II wherein $R_1$ and $R_2$ may be the same or different and are hydrogen or methyl, A is methylene ($CH_2$) and n is an integer of from 1 to 20;

(b) diacrylate or dimethacrylate compounds represented by graphic formula III:

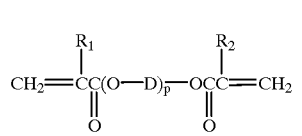

III wherein D is $CH_2CR_1R_4$, $R_4$ is hydrogen or methylene and p is an integer of from 1 to 50; and (c) an acrylate or a methacrylate compound having an epoxy group represented by graphic formula IV:

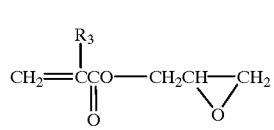

IV wherein $R_3$ is hydrogen or methyl.

In graphic formulae II, III and IV, like letters used with respect to the definitions of different substituents have the same meaning.

Examples of diacrylate or dimethacrylate compounds represented by graphic formulae II and III include diethylene glycol dimethacrylate, triethylene glycol dimethacrylate, etc., butanediol dimethacrylate and poly (oxyalkylene dimethacrylates), e.g., polyethylene glycol (600) dimethacrylate. Examples of acrylate or methacrylate compounds represented by graphic formula IV include glycidyl acrylate and glycidyl methacrylate.

Further examples of polymer substrates include: polymers, i.e., homopolymers and copolymers, of ethoxylated bisphenol A dimethacrylate monomers, ethylene glycol bismethacrylate monomers, poly(ethylene glycol) bis methacrylate monomers, ethoxylated phenol bis methacrylate monomers, alkoxylated polyhydric alcohol polyacrylate monomers, such as ethoxylated trimethylol propane triacrylate monomers, urethane acrylate monomers, such as those described in U.S. Pat. No. 5,373,033; polymers, i.e., homopolymers and copolymers, of polyfunctional, e.g., mono-, di- or multi-functional, acrylate and/or methacrylate monomers, poly($C_1$–$C_{12}$ alkyl methacrylates), such as poly (methyl methacrylate), poly(alkoxylated phenol methacrylates), acrylated oligomers of epoxies, urethanes, acrylics and polyesters and mixtures of the aforementioned materials that may be used in the preparation of suitable substrates.

Additional monomers that are substantially free of acrylic functionality that may be used at a level up to 95 weight percent, based on the total weight of the monomers, include: bis(allyl carbonate) monomers, diisopropenyl benzene monomers, styrene monomers and vinylbenzene monomers, such as those described in U.S. Pat. No. 5,475,074. Additional polymers that are substantially free of acrylic functionality that may be used with the acrylic monomer, provided that the total weight percentage of monomers and polymers substantially free of acrylic functionality is less than or equal to 95 weight percent based on the total weight of monomers and polymers in the substrate, include: cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, thermoplastic polycarbonates, polyesters, poly(ethylene terephthalate), polystyrene, poly (alpha methylstyrene), copoly(styrene-acrylonitrile), polyvinylbutyral and polymers, i.e., homopolymers and copolymers, of diallylidene pentaerythritol, particularly copolymers with polyol (allyl carbonate) monomers, e.g., diethylene glycol bis(allyl carbonate).

Preferably, the polymer substrate is an optically clear polymerized organic material prepared from transparent polymers, copolymers and blends of transparent polymers. More preferably, the polymer is prepared from organic monomers used to produce optically clear polymerizates, i.e., materials suitable for optical applications, such as for example, optical elements such as plano and ophthalmic lenses, windows, automotive transparencies, e.g., windshields, aircraft transparencies, plastic sheeting, polymeric films, etc. Such optically clear polymerizates may have a refractive index that may range from about 1.48 to about 1.75, e.g., from about 1.495 to about 1.66. Specifically contemplated is an optical resin sold by PPG Industries, Inc. under the designation CR-407™ monomer.

The polymer substrate of the present invention is in another embodiment a photochromic substrate. Photochromism is a reversible phenomenon exhibited by a compound which, when exposed to light radiation involving ultraviolet rays, such as the ultraviolet radiation in sunlight or in the light of a mercury lamp, changes color and then returns to its original color if the ultraviolet radiation is discontinued or the compound is stored in the dark. Various classes of photochromic compounds have been synthesized and suggested for use in applications in which a sunlight-induced reversible color change or darkening is desired.

Examples of organic photochromic compounds include indenonaphthopyrans, chromenes and oxazines, e.g., naphthopyrans having the 2,1 positions of an indeno group fused to the f side of the naphtho portion, and certain substituents at the 3 position of the pyran ring, substituted 2H-phenanthro[4,3-b]pyran and 3H-phenanthro[1,2-b]pyran compounds, benzopyran compounds having substituents at the 2-position of the pyran ring including a dibenzo-fused 5 member heterocyclic compound and a substituted or unsubstituted heterocyclic ring, such as a benzothieno or benzofurano ring fused to the benzene portion of the benzopyrans, spiro(benzindoline)naphthopyrans, spiro(indoline) benzopyrans, spiro(indoline)naphthopyrans, spiro(indoline) quinopyrans, spiro(indoline)pyrans, spiro(indoline) napthoxazines, spiro(indoline)pyridobenzoxazines, spiro (benzindoline)pyridobenzoxazines, spiro(benzindoline) naphthoxazines, spiro(indoline)benzoxazines, and mixtures of such photochromic compounds. Many of such photochromic compounds are described in the open literature, e.g., U.S. Pat. Nos. 3,562,172; 3,567,605; 3,578,602; 4,215,010; 4,342,668; 4,816,584; 4,818,096; 4,826,977; 4,880,667; 4,931,219; 5,066,818; 5,238,931; 5,274,132; 5,384,077;

5,405,958; 5,429,774; 5,466,398; 5,514,817; 5,552,090; 5,552,091; 5,565,147; 5,573,712; 5,578,252; 5,637,262; 5,645,767; 5,656,206; 5,658,500; 5,658,501; 5,674,432; 5,698,141. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Other photochromic substances contemplated for use in the present invention are photochromic metal-dithizonates, e.g. mercury dithizonates which are described in, for example, U.S. Pat. No. 3,361,706, fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic compounds in the aforedescribed patents are incorporated herein, in toto, by reference. The photochromic substrates of the present invention may contain one photochromic compound or a mixture of photochromic compounds, as desired. The photochromic substrates may be prepared by incorporating the photochromic compound(s) into the polymer substrate before application of the coating composition by methods known in the art.

Each of the photochromic substances described herein may be used in amounts (or in a ratio) such that a polymer substrate or polymeric coating exhibits a desired resultant color, e.g., a substantially neutral color when activated with unfiltered sunlight, i.e., as near a neutral color as possible given the colors of the activated photochromic compounds. Neutral gray and neutral brown colors are preferred. A discussion of the spectrum of such neutral colors is found in U.S. Pat. No. 5,578,252 column 11, lines 9 to 29, which is incorporated herein by reference.

The amount of photochromic substance or composition containing same applied to or incorporated into the polymer substrate or polymeric coating is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity up to a certain limit.

The relative amounts of the aforesaid photochromic compounds used will vary and depend in part upon the relative intensities of the color of the activated species of such compounds, and the ultimate color desired. Generally, the amount of total photochromic substance incorporated into or applied to a photochromic optical element may range from 0.05 to 1.0, e.g., from 0.1 to 0.45, milligrams per square centimeter of surface to which the photochromic substance (s) is incorporated or applied.

The photochromic substances may be applied to or incorporated into a host material, i.e., the polymer substrate or polymeric coating by various methods described in the art. Such methods include dissolving or dispersing the photochromic substance within the host material, e.g., casting it in place by adding the photochromic substance to the monomeric host material prior to polymerization; imbibition of the photochromic substance into the host material by immersion of the host material in a hot solution of the photochromic substance or by thermal transfer; providing the photochromic substance as a separate layer between adjacent layers of the host material, e.g., as a part of a polymeric film; and applying the photochromic substance as part of a film placed on the surface of the host material. The term "imbibition" or "imbibe" is intended to mean and include permeation of the photochromic substance alone into the host material, solvent assisted transfer of the photochromic substance, vapor phase transfer, and other such transfer mechanisms.

The host material will usually be transparent, but may be translucent or even opaque. The host material need only be transparent to that portion of the electromagnetic spectrum, which activates the photochromic substance, i.e., that wavelength of ultraviolet (UV) light that produces the open form of the substance and that portion of the visible spectrum that includes the absorption maximum wavelength of the substance in its UV activated form, i.e., the open form. Preferably, the host color should not be such that it masks the color of the activated form of the photochromic substance, i.e., so the change in color is readily apparent to the observer. More preferably, the host material article is a solid transparent or optically clear material.

The present invention is more particularly described in the following examples which are intended as illustrative only since numerous modifications and variations therein will be apparent to those skilled in the art.

EXAMPLE 1

Photochromic plastic lens blanks, which are sold by Transitions Optical Inc. (TOI), were used in the present example. The lens blanks were prepared from optical resins sold by PPG Industries, Inc., under the designations CR-407™ monomer and CR-424™ monomer which are reported to be acrylic containing polymerizable formulations. Any dust on the lenses was removed with a stream of air or nitrogen. Excessive dirt or fingerprints were removed by rinsing with water, washing with soap and rinsing or by wiping with a methanol soaked lint-free cloth followed by drying in air. The cleaned lenses were placed on a plastic tray and passed through an RPC Industries Ultraviolet Processor, Model QC120233AN/DR under standard atmospheric conditions. The Ultraviolet Processor is equipped with two 12 inch (30.5 cm) medium pressure mercury arc lamps, one standard (Type H) and one halide doped (Type D), positioned 9 inches (22.9 cm) apart and 4 inches (10.2 cm) above the conveyor. The lamp to lens distance was approximately 3.5 inches (8.9 cm). Each lamp was set to provide 200 watts per inch. The conveyor line speed was approximately 200 inches (508 cm) per minute. The resulting ultraviolet exposure, i.e., total energy density, to each lens of 1700±50 mJ/cm$^2$ was measured with an IL 390 Light Bug from International Light, Inc. The UV exposure in power density units, i.e., watts/cm$^2$, is 236.1±7 watts/cm$^2$. This number was obtained by dividing the total energy density value by the exposure time of 7.2 seconds, which is the time it takes the lens to travel beneath 24 inches of UV light at a rate of 200 inches per minute. The maximum surface temperature of the lenses during UV exposure was approximately 260–270° F. (127–132° C.). The surface temperatures were measured in 10° F. (5.6° C.) increments by placing temperature indicating strips available from Cole Parmer Instrument Co. on the center of the front surface of selected lenses.

The ultraviolet treated lenses were etched in a 12 weight percent aqueous sodium hydroxide solution maintained at 50° C. for five minutes, rinsed with deionized water maintained at 50° C. in a BRANSON 5200 ultrasonic bath for five minutes and then dried with warm, i.e., 55° C., air. Three organosilane-containing coating solutions, two of which are proprietary to TOI, designated TOI-1 and TOI-2 and Hi-Gard™, sold by PPG Industries, Inc., were applied by dipping the lenses in the coating solution for several seconds and withdrawing them from the solution at approximately 150 millimeters per minute. The coated lenses were cured at 120° C. for approximately 3 hours. The resulting dry film thickness on the lenses coated with TOI-1 was 3.5 microns, TOI-2 was 5.6 microns and Hi-Gard™ coating was 2.6 microns. The adhesion of the coatings was tested by using ASTM D-3359-93 Standard Test Method for Measuring Adhesion by Tape Test—Method B. The tape used was 3M #600 clear tape. Testing was performed prior to immersing the lenses in boiling deionized water and after 30 and 60 minutes of immersion in the boiling water. A rating of 0 in the adhesion test indicates that greater than 65 percent of the cross-cut surface exhibits flaking, i.e., loss of the coating, a rating of 5 indicates that no flaking was observed and the other ratings were determined by comparison with FIG. 1 in ASTM D-3359-93 Standard Test Method. The adhesion test results are listed in Table 1.

TABLE 1

| Coatings | Treatment | Adhesion Rating After | | |
|---|---|---|---|---|
| | | 0 Min. | 30 Min. | 60 Min. |
| TOI-1 | UV and Etch | 5 | 5 | 5 |
| TOI-1 | Etch | 4 | 0 | — |
| TOI-2 | UV and Etch | 5 | 5 | 5 |
| TOI-2 | Etch | 5 | 4 | 2 |
| Hi-Gard ™ | UV and Etch | 5 | 5 | 5 |
| Hi-Gard ™ | Etch | 0 | — | — |

The results of Table 1 show improved adhesion of the applied coatings to the lenses that were treated with ultraviolet light prior to etching.

EXAMPLE 2

The procedure of Example 1 was followed except that the effect of line speed and the output of the individual mercury lamps was determined on the adhesion of the organosilane-containing coating to the photochromic lens blanks and a fourth organosilane-containing coating solution, SolGard® coating, sold by PPG Industries, Inc., was used interchangeably with the other 3 solutions. The output of the individual mercury lamps was varied from 0 to 300 watts per inch and the line speed was varied from 72 to 280 inches (182.9 to 711.2 cm) per minute. The resulting ultraviolet exposure to each lens and the maximum surface temperatures measured are listed in Table 2 with the adhesion test results.

TABLE 2

| | Lamp Output | | Line | | | Adhesion Rating | | |
|---|---|---|---|---|---|---|---|---|
| | H Bulb | D Bulb | Speed | | | After | | |
| Run No. | Watts/ Inch | Watts/ Inch | Inches/ Minute | Temp C° | Dosage mJ/cm² | 0 Min. | 30 Min. | 60 Min. |
| 1 | 130 | 0 | 280 | 60 | 370 | 2 | 0 | 0 |
| 2 | 200 | 130 | 280 | 88 | 893 | 5 | 5 | 5 |
| 3 | 0 | 300 | 280 | 99 | 795 | 5 | 5 | 5 |
| 4 | 200 | 0 | 72 | 138 | 2300 | 5 | 5 | 5 |
| 5 | 130 | 200 | 280 | 93 | 858 | 5 | 5 | 5 |
| 6 | 130 | 130 | 72 | 143 | 2830 | 5 | 5 | 5 |
| 7 | 0 | 130 | 72 | 99 | 1410 | 5 | 5 | 5 |
| 8 | 0 | 0 | 280 | 24 | 0 | 2 | 0 | 0 |
| 9 | 300 | 0 | 72 | 182 | 3320 | 5 | 5 | 5 |
| 10 | 200 | 0 | 280 | 77 | 566 | 5 | 1 | 1 |
| 11 | 0 | 200 | 72 | 143 | 2217 | 5 | 5 | 5 |
| 12 | 300 | 200 | 280 | 143 | 1330 | 5 | 5 | 5 |
| 13 | 130 | 300 | 72 | 182 | 4670 | 5 | 5 | 5 |
| 14 | 130 | 130 | 280 | 77 | 669 | 5 | 5 | 5 |
| 15 | 0 | 0 | 176 | 24 | 0 | 5 | 0.5 | 0 |
| 16 | 300 | 130 | 72 | 182 | 4629 | 5 | 4 | 2.5 |
| 17 | 200 | 200 | 176 | 143 | 1935 | 5 | 5 | 5 |
| 18 | 0 | 200 | 176 | 99 | 941 | 5 | 5 | 5 |
| 19 | 130 | 300 | 176 | 138 | 1614 | 5 | 5 | 1 |
| 20 | 300 | 130 | 176 | 143 | 1983 | 5 | 5 | 5 |
| 21 | 300 | 300 | 72 | 249 | 6346 | 5 | 4 | 1.5 |
| 22 | 200 | 200 | 280 | 99 | 1097 | 5 | 5 | 5 |
| 23 | 200 | 300 | 176 | 160 | 2329 | 5 | 5 | 5 |
| 24 | 200 | 130 | 176 | 110 | 1573 | 5 | 5 | 5 |
| 25 | 130 | 0 | 72 | 99 | 1467 | 5 | 5 | 5 |
| 26 | 300 | 0 | 176 | 154 | 1449 | 5 | 5 | 5 |
| 27 | 130 | 200 | 176 | 116 | 1518 | 5 | 5 | 5 |
| 28 | 0 | 130 | 280 | 60 | 334 | 5 | 5 | 5 |
| 29 | 300 | 200 | 176 | 160 | 2427 | 5 | 5 | 5 |
| 30 | 300 | 300 | 280 | 154 | 1560 | 5 | 5 | 5 |
| 31 | 130 | 0 | 176 | 77 | 636 | 5 | 1 | 1 |
| 32 | 200 | 200 | 72 | 171 | 4499 | 5 | 5 | 3 |
| 33 | 200 | 300 | 72 | 193 | 5466 | 5 | 4 | 0.5 |
| 34 | 0 | 300 | 176 | 154 | 1382 | 5 | 5 | 5 |
| 35 | 300 | 200 | 72 | 193 | 5427 | 5 | 5 | 5 |
| 36 | 130 | 0 | 280 | 60 | 363 | 5 | 0 | 0 |
| 37 | 200 | 130 | 280 | 93 | 891 | 4 | 4 | 4 |
| 38 | 0 | 300 | 280 | 99 | 785 | 5 | 5 | 5 |
| 39 | 200 | 0 | 72 | 143 | 2297 | 5 | 5 | 5 |
| 40 | 130 | 200 | 280 | 93 | 852 | 5 | 5 | 5 |
| 41 | 200 | 200 | 180 | 132 | 1671 | 5 | 5 | 5 |

The results in Table 2 show that the coated photochromic lens blanks of Runs No. 8 and 15, having no UV exposure, failed, i.e., had an O rating in the adhesion test when evaluated after 30 or 60 minutes in boiling deionized water, respectively. The coated lens blanks of Runs No. 1 and 36 did not show an improvement in their coating adhesion as compared to the lens blanks of Runs 8 and 15 having no UV exposure. In Runs 1 and 36, the lens blanks were exposed to only the UV wavelengths of the Type H bulb resulting in a UV dosage and temperature exposure of approximately 370 mJ/cm² and 60° C. All of the coated lenses of the other Runs demonstrated improved adhesion as compared to the lens blanks having no UV exposure prior to etching with an aqueous sodium hydroxide solution as described in Example 1.

Although the present invention has been described with reference to specific details of certain embodiments thereof, it is not intended that such details should be regarded as limitations upon the scope of the invention except insofar as they are included in the accompanying claims.

We claim:

1. A process for improving the adhesion of a polymeric coating to an organic polymeric substrate comprising:
   (a) irradiating the surface of a polymeric substrate prepared from a monomer formulation having acrylic functionality in an oxygen containing environment with a dosage from 700 to 4,000 mJ/cm² of ultraviolet light having a substantial energy distribution in the electromagnetic spectrum greater than 300 nm;
   (b) etching the treated surface of step (a); and
   (c) applying to the etched surface of step (b) a polymeric coating.

2. The process of claim 1 further comprising the step of curing said applied polymeric coating of step (c).

3. The process of claim 1 wherein said dosage of ultraviolet light is from 1000 to 2,500 mJ/cm$^2$.

4. The process of claim 3 wherein said adhesion improving amount is at least 500 mJ/cm$^2$ and not greater than 2,000 mJ/cm$^2$.

5. The process of claim 1 wherein the surface temperature of said organic polymeric substrate is between 25° C. and 185° C. during said irradiating step.

6. The process of claim 5 wherein the surface temperature of said organic polymeric substrate is between 90° C. and 135° C. during said irradiating step.

7. The process of claim 1 wherein said polymeric coating comprises at least one polymer obtained from a member selected from the group consisting of polyurethane, melamine resins, organosilanes, polyvinyl alcohol, polyacrylate, polyamide and epoxy resins.

8. The process of claim 7 wherein said polymeric coating is a polymer-forming organosilane.

9. The process of claim 8 wherein said polymeric coating is non-tintable.

10. The process of claim 1 wherein said polymeric substrate is prepared from a monomer formulation having acrylic functionality and additional monomers substantially free of acrylic functionality.

11. The process of claim 1 wherein said atmosphere is an oxygen containing gaseous mixture of which the partial pressure of oxygen is at least 15 Torr.

12. The process of claim 11 wherein said partial pressure of oxygen is at least 150 Torr.

13. The process of claim 1 wherein said etching step is selected from the group consisting of treatment with strong alkali, activated gas, ionizing radiation or a combination of such treatments.

14. The process of claim 13 wherein said etching step is treatment with strong alkali.

15. The process of claim 1 wherein said polymeric substrate is a photochromic substrate.

* * * * *